(12) United States Patent
Shakirzianov et al.

(10) Patent No.: US 9,377,999 B2
(45) Date of Patent: Jun. 28, 2016

(54) SEMANTIC CONTENT ACCESSING IN A DEVELOPMENT SYSTEM

(71) Applicant: Microsoft Technology Licensing, LLC, Redmond, WA (US)

(72) Inventors: Anton Shakirzianov, Seattle, WA (US); Suriya Narayanan, Redmond, WA (US); Liang Yu, Sammamish, WA (US); Tomasz Kaminski, Issaquah, WA (US)

(73) Assignee: Micosoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/539,521

(22) Filed: Nov. 12, 2014

(65) Prior Publication Data
US 2015/0347533 A1  Dec. 3, 2015

Related U.S. Application Data

(60) Provisional application No. 62/006,662, filed on Jun. 2, 2014.

(51) Int. Cl.
*G06F 17/30* (2006.01)
*G06F 9/44* (2006.01)

(52) U.S. Cl.
CPC .. *G06F 8/33* (2013.01); *G06F 8/20* (2013.01); *G06F 17/30554* (2013.01); *G06F 17/30731* (2013.01)

(58) Field of Classification Search
CPC ................ G06F 8/10; G06F 8/20; G06F 8/24
USPC ........................................................ 717/104
See application file for complete search history.

(56) References Cited

U.S. PATENT DOCUMENTS

| | | | |
|---|---|---|---|
| 7,873,356 B2 * | 1/2011 | Flynt ..................... | G06F 3/0482 455/418 |
| 8,566,789 B2 | 10/2013 | Siddaramappa et al. | |
| 8,595,246 B2 | 11/2013 | Fay et al. | |
| 8,645,905 B2 | 2/2014 | Halbedel | |
| 2006/0090154 A1 * | 4/2006 | Bustelo ..................... | G06F 8/24 717/110 |
| 2007/0050343 A1 | 3/2007 | Siddaramappa et al. | |
| 2010/0169871 A1 * | 7/2010 | Villadsen .................. | G06F 8/75 717/144 |
| 2014/0025671 A1 | 1/2014 | Marlow et al. | |

OTHER PUBLICATIONS

International Search Report and Written Opinion for International Application No. PCT/US2015/033554 date of mailing: Oct. 6, 2015, date of filing: Jun. 1, 2015, 15 pages.

(Continued)

*Primary Examiner* — John Chavis
(74) *Attorney, Agent, or Firm* — Thomas Marquis; Kate Drakos; Micky Minhas

(57) ABSTRACT

A development system comprises, in one example, a development module configured to receive user development inputs to develop elements of a computer system. The elements comprise types modeled in the computer system. The development system comprises a user interface module configured to generate a user interface display with user input mechanisms that receive a user search query for searching the elements of the computer system. The development system comprises a search module configured to identify a type-based search parameter for the user search query and to obtain a set of search results by performing an element search based on the user search query and the type-based search parameter.

20 Claims, 13 Drawing Sheets

(56) References Cited

OTHER PUBLICATIONS

Poshyvanyk, et al., "JIRiSS—an Eclipse plug-in for Source Code Exploration", In 14th IEEE International Conference on Program Comprehension, Jun. 14, 2006, 4 pages.

Poshyvanyk, et al., "IRiSS—A Source Code Exploration Tool", In Proceedings of 21st IEEE International Conference on Software Maintenance, Sep. 25, 2005, 4 pages.

"Semantics-Based Code Search", Published on: Oct. 9, 2009, Available at: http//cs.brown.edu/~spr/research/s6.html.

Howard, et al., "Automatically Mining Software-Based, Semantically-Similar Words from Comment-Code Mappings", In Proceedings of the 10th Working Conference on Mining Software Repositories, May 18, 2013, 10 pages.

Keivanloo, et al., "Semantic Web-based Source Code Search", In Proceedings of 6th International Workshop on Semantic Web Enabled Software Engineering, Retrieved on: Jun. 4, 2014, Available at: http://homepages.abdn.ac.uk/staylor/pages/swese2010/pdf/swese2010_submission_2-1.pdf.

* cited by examiner

SEMANTIC CONTENT ACCESSING IN A DEVELOPMENT SYSTEM

CROSS-REFERENCE TO RELATED APPLICATION

The present application is based on and claims the benefit of U.S. provisional patent application Ser. No. 62/006,662, filed Jun. 2, 2014, the content of which is hereby incorporated by reference in its entirety.

BACKGROUND

Computer programs are developed on various development tools. For example, many software developers use interactive (or integrated) development environments (IDEs) in order to develop software. The developers use an IDE in order to develop models of types within a computer system, and in order to customize those models.

An exemplary interactive development environment includes a plurality of different tools so that developers can develop and test the code that needs to be developed and in order to customize a computer system as desired. By way of example, an IDE may include a source code editor, one or more build automation tools and a debugger that allow computer programmers to develop software. Some IDEs illustratively include a compiler, an interpreter, or both. They may include a version control system and various tools to simplify the construction of graphical user interfaces. They can also include a class browser, an object browser, and a class hierarchy diagram for use with object oriented software development. Thus, developers can use IDEs to generate the code and metadata, along with customizations to code and metadata, which may be utilized in developing a system for use in a given organization. For example, a developer can work with source code and metadata files which relate to application elements. One application can require creating or changing both metadata and code that consumes the metadata in various ways.

In generating or customizing software using an IDE, the application developer models specific concepts (which may be represented as types) within an application and, where necessary, writes code. Large applications, for which developers often use IDEs, can include thousands of different types.

By way of example, some computer systems include business systems, such as enterprise resource planning (ERP) systems, customer relations management (CRM) systems, line-of-business (LOB) systems, among others. These types of computer systems often have many thousands of different types that are modeled and customized. By way of example, some such business systems often have thousands of different forms, alone, not to mention many other types.

Business systems are not the only types of computer systems that have a large number of types. For instance, gaming systems, or a wide variety of other types of systems, often also have many thousands of different types that are modeled in the software system.

The discussion above is merely provided for general background information and is not intended to be used as an aid in determining the scope of the claimed subject matter.

SUMMARY

During software development, a developer searches for elements to facilitate the development process. A search architecture allows a developer to search for metadata and code that meet certain criteria. The search architecture leverages semantic element information to return results that are relevant to the developer's query.

A development system comprises, in one example, a development module configured to receive user development inputs to develop elements of a computer system. The elements comprise types modeled in the computer system. The development system comprises a user interface module configured to generate a user interface display with user input mechanisms that receive a user search query for searching the elements of the computer system. The development system comprises a search module configured to identify a type-based search parameter for the user search query and to obtain a set of search results by performing an element search based on the user search query and the type-based search parameter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
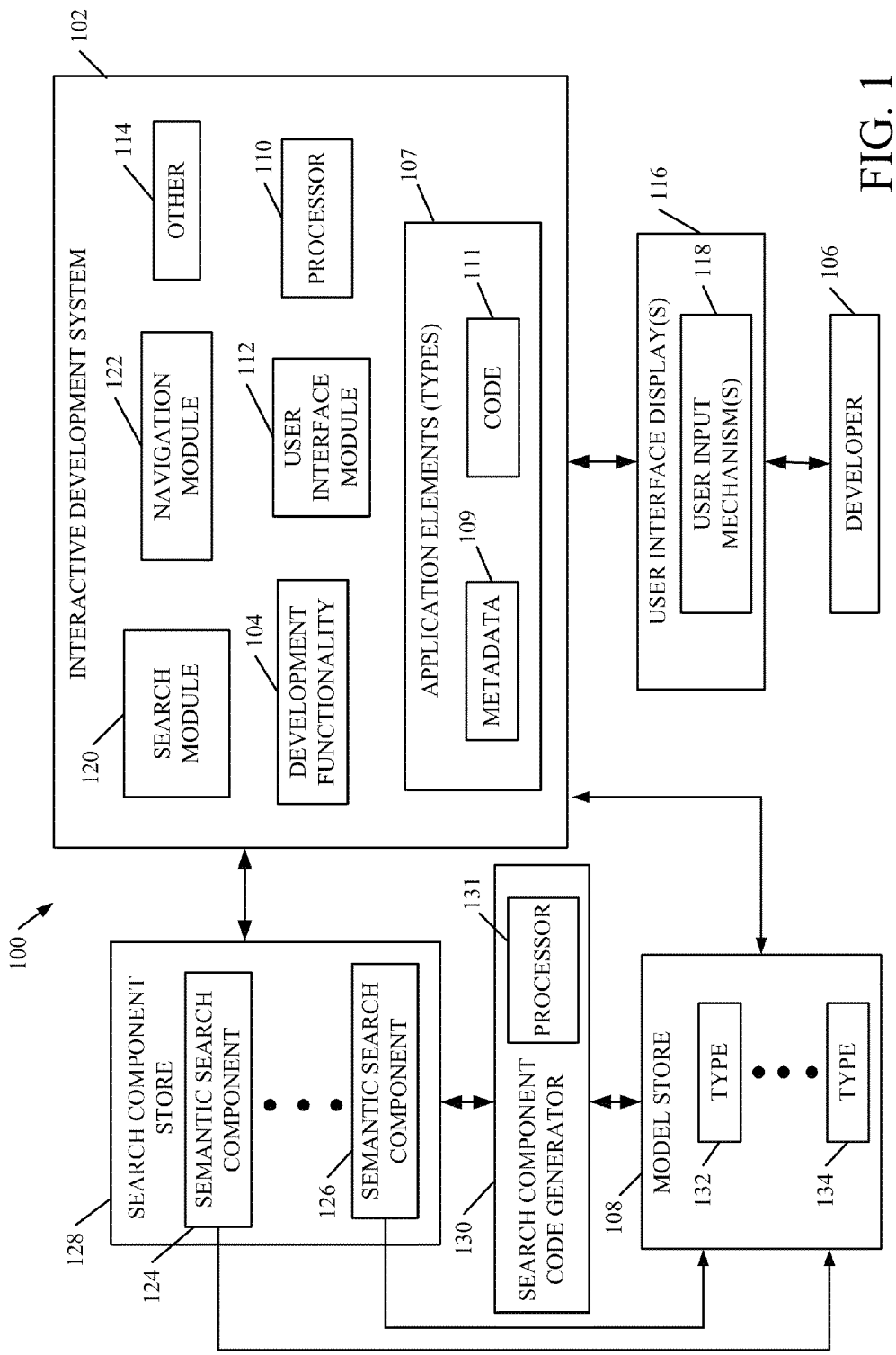
FIG. 1 is a block diagram of one example of a semantic search architecture.

FIG. 1 is a block diagram of one example of a semantic search architecture 100. Architecture 100 includes an interactive development system (e.g., an IDE) 102 having development functionality 104. FIG. 1 shows that a developer 106 interacts with system 102 to perform development and/or customization of application elements 107 that are run in a computer system. For instance, each of the application elements include metadata 109, and can include code 111 as well. By way of example, developer 106 uses functionality 104 to develop elements 107 for an application, such as by creating or changing metadata 109 and code 111. In one example, but not by way of limitation, the elements 107 comprise objects in an object-oriented programming environment. Any suitable programming language(s) can be utilized in system 102.

In the illustrated example, a model store 108 stores the metadata and code corresponding to various different types of application elements (e.g., types), and is accessible, for instance, by system 102 and a search component code generator 130. A "type" refers to an abstraction, representing concepts modeled in a system. For instance, in a business system, element types can include forms, entities, classes, tables, menu items, security roles, and/or permissions, to name a few. In one example, table objects contain metadata and code for persisting application data in a database. In another example, form objects contain metadata and code to describe information content to be displayed in various devices for application users to consume information and interact with the application.

In one example, when utilizing development functionality 104 to develop application elements 107, developer 106 is presented with an integrated or IDE view for coding the application elements 107. One simplified example is shown in Table 1 below for illustration.

TABLE 1

```
public class Table1 extends common
{
    /// <summary>
    ///
    /// </summary>
    private void Method1( )
    {
    }
    /// <summary>
    ///
    /// </summary>
    public void insert( )
    {
        super( );
    }
}
```

In this manner, code and metadata being authored by developer 106 to develop application elements 107 is presented in a first format, for example in a code editor view that provides a user-friendly interface for coding the application elements 107. However, while developer 106 views and authors the code and metadata in the first format, interactive development system 102 maintains and operates on a source code representation of the developed application elements in a second format that is different than the first format. In one example, a serialized representation comprising code and metadata is maintained by system 102 for each element. The second format is machine-readable and amenable to execution by system 102. In one example, but not by limitation, model store 108 comprises a file system that stores the source code representations as XML files. The metadata and code XMLs comprise serialized element structures, each with its own type. Table 2 below shows an example XML file that corresponds to the integrated view shown in Table 1:

TABLE 2

```
<?xml version="1.0" encoding="utf-8"?>
<AxTable xmlns:i="http://www.w3.org/2001/XMLSchema-instance">
    <Name>Table1</Name>
    <SourceCode>
        <Declaration><![CDATA[
public class Table1 extends common
{
}
]]></Declaration>
        <Methods>
            <Method>
                <Name>Method1</Name>
                <Source><![CDATA[
    /// <summary>
    ///
```

TABLE 2-continued

```
    /// </summary>
    private void Method1( )
    {
    }
]]></Source>
            </Method>
            <Method>
                <Name>insert</Name>
                <Source><![CDATA[
    /// <summary>
    ///
    /// </summary>
    public void insert( )
    {
        super( );
    }
]]></Source>
            </Method>
        </Methods>
    </SourceCode>
    <Label>@SYS1234</Label>
    <DeleteActions />
    <FieldGroups>
        <AxTableFieldGroup>
            <Name>AutoReport</Name>
            <Fields />
        </AxTableFieldGroup>
        <AxTableFieldGroup>
            <Name>AutoLookup</Name>
            <Fields />
        </AxTableFieldGroup>
        <AxTableFieldGroup>
            <Name>AutoIdentification</Name>
            <AutoPopulate>Yes</AutoPopulate>
            <Fields />
        </AxTableFieldGroup>
        <AxTableFieldGroup>
            <Name>AutoSummary</Name>
            <Fields />
        </AxTableFieldGroup>
        <AxTableFieldGroup>
            <Name>AutoBrowse</Name>
            <Fields />
        </AxTableFieldGroup>
    </FieldGroups>
    <Fields>
        <AxTableField xmlns=""
            i:type="AxTableFieldString">
            <Name>Field1</Name>
        </AxTableField>
    </Fields>
    <FullTextIndexes />
    <Indexes />
    <Mappings />
    <Relations />
    <StateMachines />
</AxTable>
```

In the above example, the metadata and code are serialized into one XML file. That is, snippets of code (i.e., unstructured strings) and metadata (i.e., structured sets of properties and values) are interspersed in the XML file. However, one skilled in the art understands that other formats can be utilized.

Developer 106 can interact with interactive development system 102 either through a separate developer device (such as a personal computer, a tablet, another mobile device, etc.), or directly. Developer 106 can also interact with system 102 over a network (e.g., remotely). Developer 106 is shown interacting directly (e.g., locally) with system 102 in FIG. 1 for the sake of example only.

Interactive development system 102, in one example, includes a processor 110 and user interface module 112. User interface module 112 generates user interface displays 116 with user input mechanisms 118, for interaction by developer 106. Developer 106 interacts with user input mechanisms 118 in order to control and manipulate interactive development system 102. In one example, developer 106 can do this to implement development functionality 104 as well as to use a search module 120 and a navigation module 122. System 102 can include other items 114 as well.

Developer 106 can use existing code and metadata in model store 108, or generate new code and metadata or a combination of existing and new code and metadata. In doing so, existing elements in model store 108 may be changed or deleted, and new elements may be added. To facilitate development, the developer 106 may desire a search of model store 108 to find elements of interest. For instance, developer 106 may desire to locate a particular element to customize within the application.

However, due in part to the size of the codebase, which is often quite large, it can be difficult to find elements that meet certain developer search criteria. One searching implementation relies on building an index ahead of time, against which the developer query is executed. For example, there are crawlers that navigate content and build indexes, which are then used to search. In the case of a development platform, once an element is changed or added, the index becomes out of date. Further, given the size of the codebase, rebuilding the index repeatedly takes a great deal of time.

In the illustrated example, semantic search architecture 100 obtains search results by using search module 120 to semantically search model 108 taking into account the elements' names, types, and/or properties. The search is semantic in that it leverages an understanding of the structure of the element types, and a meaning of the element types and the properties within those element types. As discussed in further detail below, the particular structure of the element types can be relevant to searching the elements of model store 108. By way of illustration, but not by limitation, each element type has a particular structure of properties, methods, and/or computations that define runtime behavior for elements of that element type. For example, a table element type can include a name (e.g., "customer table") and a set of properties that identify attributes for a customer (e.g., customer ID, address, etc.). Also, in this example, the table element type can include a method for computing a value for the customer and/or a method for displaying the value.

Before describing the overall operation of architecture 100 in more detail, a brief overview will be provided. In one example, search module 120 comprises a search engine that receives a user search query defining search criteria in the form of one or more tokens. The tokens define search parameters, and can include one or more characters forming a string or term. The search engine parses the search query from developer 106 to identify a semantic search parameter or constraint and executes the search query against model store 108 to obtain a set of search results that are provided to developer 106. In one example, executing the query comprises matching the one or more tokens against properties and/or methods in the application elements.

The semantic search parameter can be explicitly provided in the search query itself, or can be implied or derived from the search query. For instance, in the example described below with respect to FIG. 5, developer 106 enters a search query of:

type:table, method name:insert property: "source=crosscompany"

Here, the semantic search parameter identified from the query comprises a type-based constraint. That is, the developer 106 desires elements that are of the element type "table", have a method with a name matching the token "insert", and a source property with a value matching the token "crosscompany". While embodiments are herein discussed in the context of type-based constraints, it noted that other semantic search parameters or constraints can be used.

In the illustrated example, to perform the search, search module 120 accesses a search component store 128 that stores a plurality of search components (i.e., search components 124 and 126) that have been generated by a search component code generator 130. One example of generating search components using search component code generator 130 is discussed in further detail below with respect to FIG. 2. Briefly, search component code generator 130 includes a processor 131 configured to generate a search component for each different element type modeled in model store 108. Each search component is generated for a particular one of the element types. In this manner, each search component is specific to the structure of the particular element type for which it was generated. In one example, search components are generated and stored in store 128 for all possible element types that can be used by developer 106. For instance, in one example a pre-defined set of element types are available to developer 106, and any new element types are added to system 102 through an update to system 102.

Search module 120 uses the type-based search constraints from the search query to identify one or more of the search components from search component store 128 to be used to return a list of results, from the elements in model store 108. One example of searching model store 108 using the search components is discussed in further detail below with respect to FIG. 4. Briefly, search module 120 identifies a corresponding search component for each type-based search constraint. In the above example, search module 120 identifies the search component (i.e., search component 124 or 126) that was generated for the table element type. The identified search component is instantiated for each element in model store 108 having the table element type, to identify elements that match the method name and property values in the search query. The search module 120 aggregates search results obtained from the instantiated search component. Navigation module 122 facilitates user navigation of the search results.

Search architecture 100 thus leverages semantic information regarding the application elements 107 in performing a search of model store 108, without having to build or maintain an index ahead of time. This may reduce processing load and time, and memory requirements in executing the search functionality in the development system, and may improve search result relevancy to the user's query.

For sake of illustration, in the example of FIG. 1, for each different type of application element, architecture 100 maintains a specific search components that is configured to search the existing elements of model store 108 of that element type. However, those search components are also able to search any new elements added by developer 106 to model store 108, regardless of the type (i.e., all element types have a pre-defined search component) or the specific properties of the new element. Conversely, in the case of an indexed search system, adding the new elements to the model store 108 would require that the index be updated to include the new elements.

For sake of further illustration, assume that model store 108 includes two different element types (i.e., a table element type 132 and a form element type 134). A first search component 124 is generated for element type 132 and a second search component 126 is generated for element type 134. In the example of FIG. 1, code generator 130 only needs to be run once for each element type. In this manner, once search components 124 and 126 have been generated, code generator 130 does not need to regenerate or modify them, even if existing elements of types 132 and 134 are modified in model store 108 and/or new elements of types 132 and 134 are added in model store 108.

Search component 124 is instantiated when search module 120 searches for elements of type 132 and search component 126 is instantiated when search module 120 searches for elements of type 134. In one example, when both element types 132 and 134 are being searched, search components 124 and 126 can operate in parallel to reduce the search time. It is noted that while only two element types and type-based search components are shown in FIG. 1, any number of element types and semantic search components can be implemented.

While model store 108 and search component store 128 are illustrated in FIG. 1 as being separate from interactive development system 102, it is noted that model store 108 and/or search component store 128 can be part of interactive development system 102. However, due to bandwidth and latency considerations, in some implementations model store 108 and search component store 128 can be maintained on a same computing system, although this is just one example. In this manner, while the search requests and results may be sent over a network, search architecture 100 does not require transmission of the model store 108. Again, this is just one example of an architecture.

Also, FIG. 1 shows a variety of different functional blocks. It will be noted that the blocks can be consolidated so that more functionality is performed by each block, or they can be divided so that the functionality is further distributed.

It should also be noted that the above discussion has shown a number of data stores, including model store 108 and search component store 128. While these are shown as two independent data stores, they could also be formed within a single data store. In addition, the data in those data stores can be stored in multiple additional data stores as well. Also, the data stores can be local to the environments, agents, modules, and/or components that access them, or they can be remote therefrom and accessible by those environments, agents, modules, and/or components. Similarly, some can be local while others are remote.

In the illustrated example, processors 110 and 131 comprise computer processors with associated memory and timing circuitry (not separately shown). They are a functional part of the agent or environment to which they belong, and are illustratively activated by, and facilitate the functionality of, other items in that environment or agent.

Figure 2:
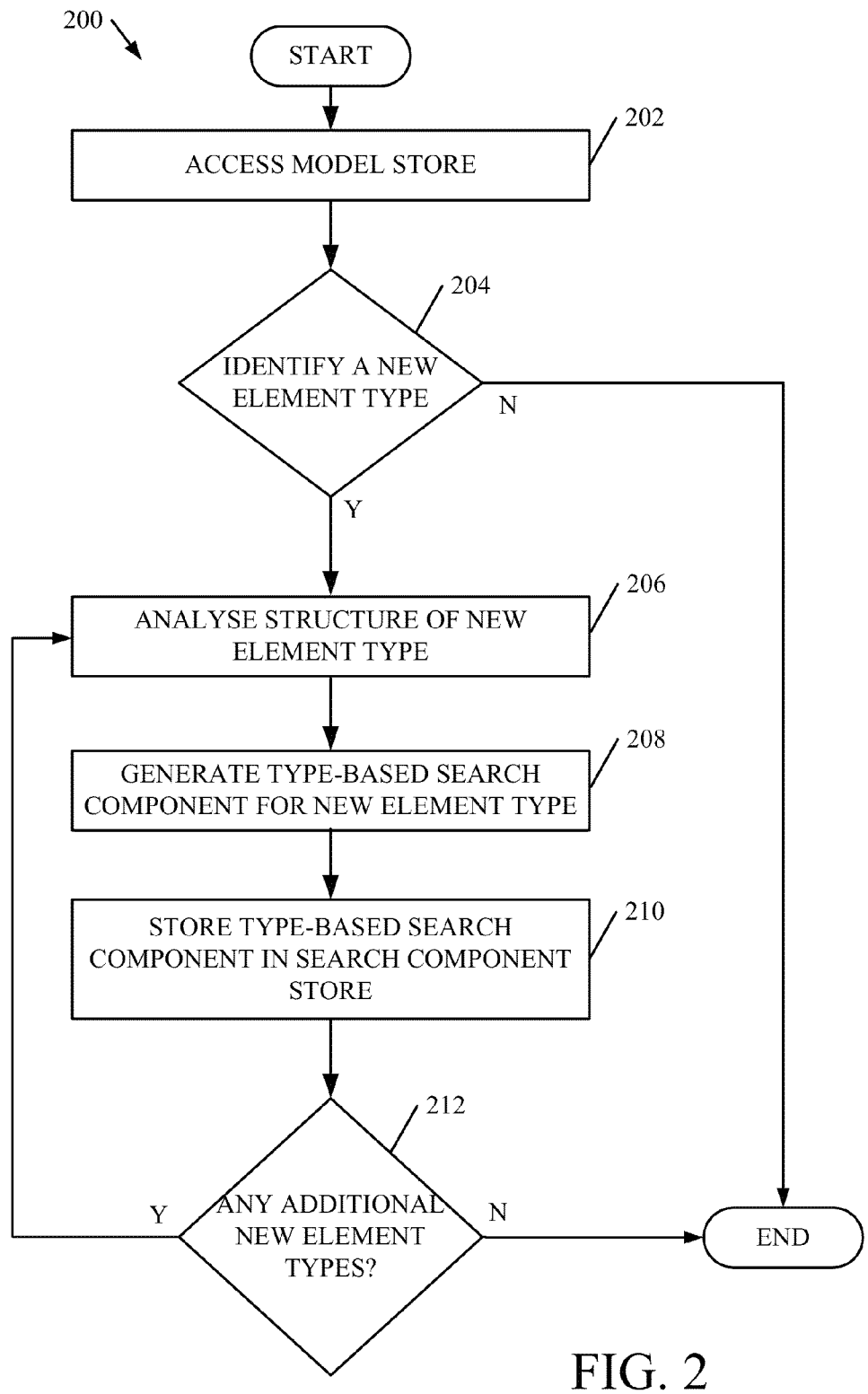
FIG. 2 is a flow diagram illustrating one example of a method for generating semantic search components.

FIG. 2 is a flow diagram illustrating one example of a method 200 for generating semantic search components. For sake of illustration, but not by limitation, method 200 will be described in the context of architecture 100 generating type-based search components.

Method 200 can be initiated periodically and/or in response to a condition or event. For example, method 200 can be initiated in response to an update to system 102 that adds or modifies the element types that are supported by system 102. In another example, method 200 can be initiated in response to an input from developer 106 (e.g., by selecting a control such as open, close, save, etc. on user interface 116).

At step 202, search component code generator 130 accesses model store 108 and determines, at step 204, whether there are any new element types for which to generate a type-based search component. In one example, search component code generator 130 analyzes some (e.g., the most recent changes and additions), or all, of the elements in model store 108 and compares those elements against existing or known element types (i.e., types 132 and 134). For instance, search component code generator 130 identifies elements that have been changed or added by developer 106.

If a new element type is identified, search component code generator 130 analyzes the structure of the new element type at step 206 to generate a type-based search component for the new element type at step 208. In one example, search component code generator 130 parses the structure of the new element type into any subtypes, and determines what properties the type and/or subtypes contain, any child element types, what element types derive from the element type, and an implementation for property getters of the element type. Each property getter defines a function for retrieving a property of the element type, for example based on the location of the property in the element type and/or relationships to other properties. In one example, search component code generator 130 generates different property getter code to search different portions of the element type structure. For instance, one piece of the code can search methods in a given portion of the element and one piece of the code can look at controls, etc. With respect to the customer table element type example discussed above, one property getter could be configured to return the "customer ID" property" and another property getter could be configured to return the "address" property.

Each search component is configured to follow a defined element pattern (e.g., a pattern of child elements, properties, methods, etc.), which is based on the element type for which the search component is generated. For example, but not by limitation, in FIG. 1 element types 132 and 134 have different patterns of child elements from one another. Search component 124 is configured to call search method(s) to examine and return values of the child elements associated with element type 132, and search component 126 is configured to call search method(s) to examine and return values of the child elements associate with element type 134.

By way of example, one metadata element comprises a tree data structure and is defined by a name and a metadata element type. The metadata element type is further defined by a set of properties, with each property defined by a name and a type of a property value. The type of property value can be, for example but not by limitation, primitive (convertible to a string (YesNo, Date, Tags, etc.)). Such property is referred to as a "simple property". Another type of property value is a metadata element type, containing child metadata elements. Such property can be referred to as a "node property". Root metadata elements are elements that are stored directly in metadata storage and do not have any parents. Child metadata elements are elements that are contained in some of the other element node property. A metadata path comprises a string that uniquely identifies the metadata element and facilitates locating the metadata element. In one example, the form of the path is:

```
dynamics://<Root_type>/<Root_element_name>[/<Subtype_1>/<Subelement_name_
1>[/<Subtype_2>/<Subelement_name_2>[...]]]
Where:
    <Root_type> - type of the root metadata element
    <Root_element_name> - name of the root element
    <Subtype_i> - types of each child metadata element in a tree
    <Subelement_name_i> - names of each child metadata element in a tree
```

At step 210, the generated semantic search component is stored in search component store 128. If any additional new element types are identified at step 212, steps 206, 208, and 210 are repeated for the new element type(s).

Figure 3:
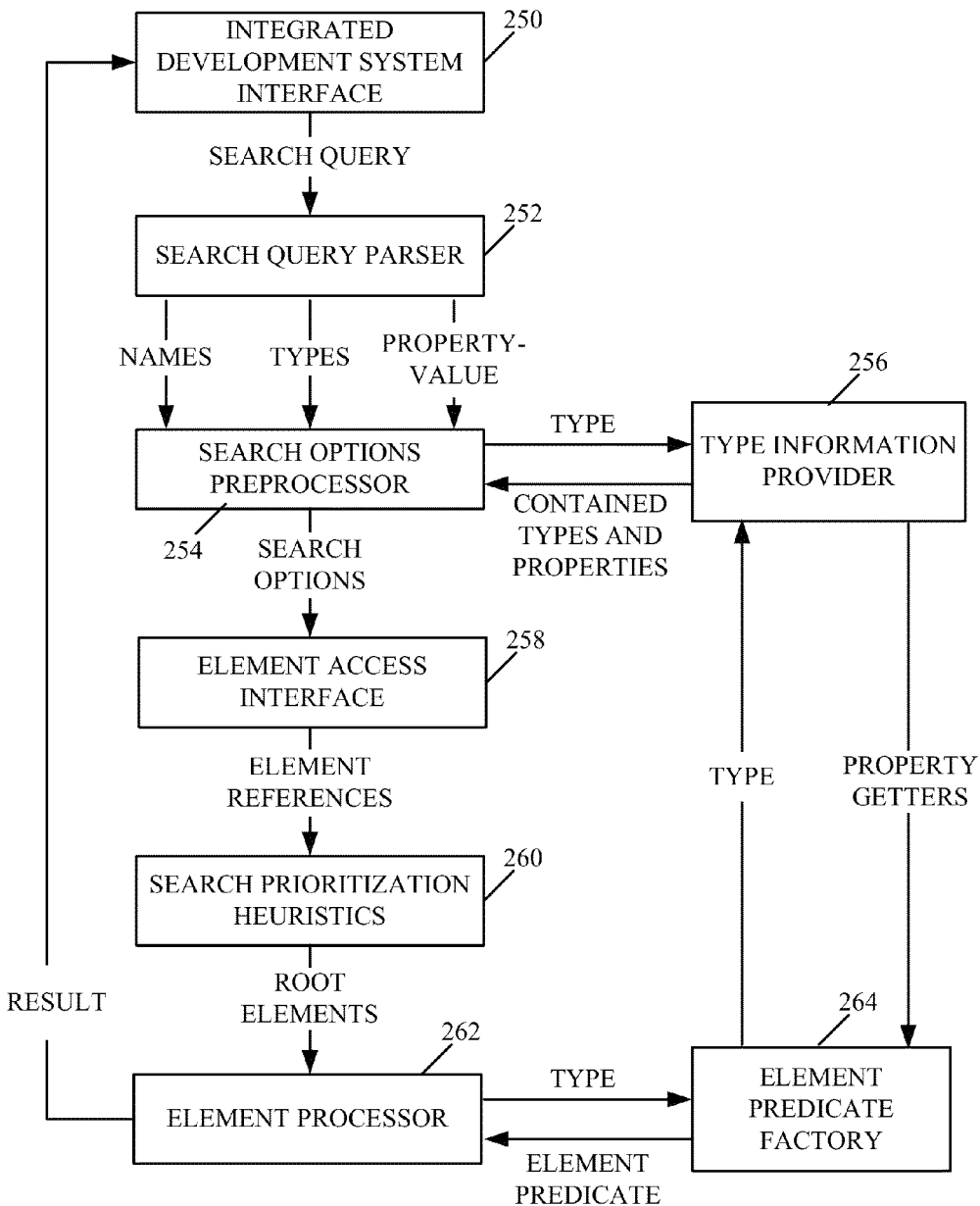
FIG. 3 is a block diagram illustrating semantic search functionality, under one example.

FIG. 3 is a block diagram illustrating semantic search functionality, under one example. For sake of illustration, but not by limitation, FIG. 3 will be described in the context of semantic search functionality in architecture 100.

Block 250 provides an interface to interactive development system 102. Through block 250, search module 120 receives a search query that is provided to a query parser at block 252. The query provides one or more search criteria that define filter(s), and can have any suitable syntax or grammar.

One relatively simple syntax example is provided below:
Search query is search_string, where:
search_string=empty_string
search_string=text_without_colon
search_string=filter
search_string=search_string filter
filter=filter_name:filter_value
filter_value=text_without_comma
filter_value="any_text"
filter_value=filter_value,filter_value
filter_name=name OR type OR model OR property
So the search string consists of a set of filters in the general form:

```
<filter_1>:<filter_1_value>[ <filter_2>:<filter_2_value> ...[ <filter_N>:<filter_N_value>]]
```

Where <filter_i> is one of the acceptable filter names, and <filter_i_value> is comma separated and possible quoted filtering values.

As illustrated above and shown in FIG. 3, one example of user search criteria is element name, which can specify one string or a set of strings. An element is considered to meet this criteria if the element's name contains at least one of the strings. Each comma separated value can be an acceptable element name. In one example, element name is the default filter. Thus, if a search query includes a single token, it is assumed to be the element name. In this example, if no type-based constraint is identified, the search architecture can instantiate the search components for all available element types.

Another example criteria is element type, which can specify one element type or a set of element types. An element is considered to meet this criteria if it is of one of the specified types. Each comma separated value can be a name of one of the element types (i.e. table, class, field). The search query can specify both root and subtypes as a value. In one example, filtering logic can be as follows:
    (roottype_1 OR roottype_2 OR . . . OR roottype_N) AND
        (subtype_1 OR subtype_2 OR . . . OR subtype_N)

Another example criteria is element property, which can specify a set of key-value pairs "property's name-property's value". An element is considered to meet the criteria if for each pair it is true that a) the element contains a "simple" property with the specified name, and b) this property's value converted to a string contains the specified value. Each comma separated value can be in the form property_name=property_value.

At block 254, one or more type-based search components (e.g., component 124 and/or 126) are instantiated based on identified element type(s). For example, this can be performed by accessing type information (for example from type-based search component store 128) at block 256 based on the type filter criteria from parser block 252. Block 256 provides information about the element type(s) including, but not limited to, what properties the type(s) contain, the types of child elements of the element type, what element types are derived from the element type, and implementation of property getters for the element type.

In one example, block 254 uses type information provided by block 256 to process the search options in order to accord types criteria with property criteria. If the search criteria includes one or more properties, using type information block 254 can filter out all element types that cannot contain the searched properties.

For each element type to be searched, the corresponding type-based search component is instantiated in accordance with the code generated by code generator 130.

At block 258, references to elements in model store 108 are obtained according to the search criteria from block 254 and the semantic search components instantiated at block 256. For example, metadata element references can facilitate getting a root element's name (quick operation that is not connected with storage access) and/or loading the element (relatively long operation connected with storage access).

At block 260, the element references obtained at block 258 are prioritized into chunks based on, for example, the specified criteria of the element's name or other heuristics. For instance, a root element having a name that contains any of the searched names would be processed before root elements that do not contain the name.

Block 262 processes specific elements in model store 108 to determine if they meet the search criteria. In one example, an element is considered to meet the search criteria if the element's type is one of the required types specified at block 254, the element's name contains one of the required names or a part thereof, and for each pair "property's name-property's value" specified by search criteria it is true that the element contains a property with such a name, and this property's value contains the specified property's value.

In one example, block 262 obtains an element predicate function or other information from block 264, which is used to determine whether an element meets search criteria. Block 264 creates a predicate function for each of the element types, provided by 262, using information from block 256. For example, block 264 provides the element types to block 256 and receives information on implementation of property getters for each element type.

If an element in model store 108 meets the search criteria, the result is provided to the developer 106 through interface block 250.

Figure 4:
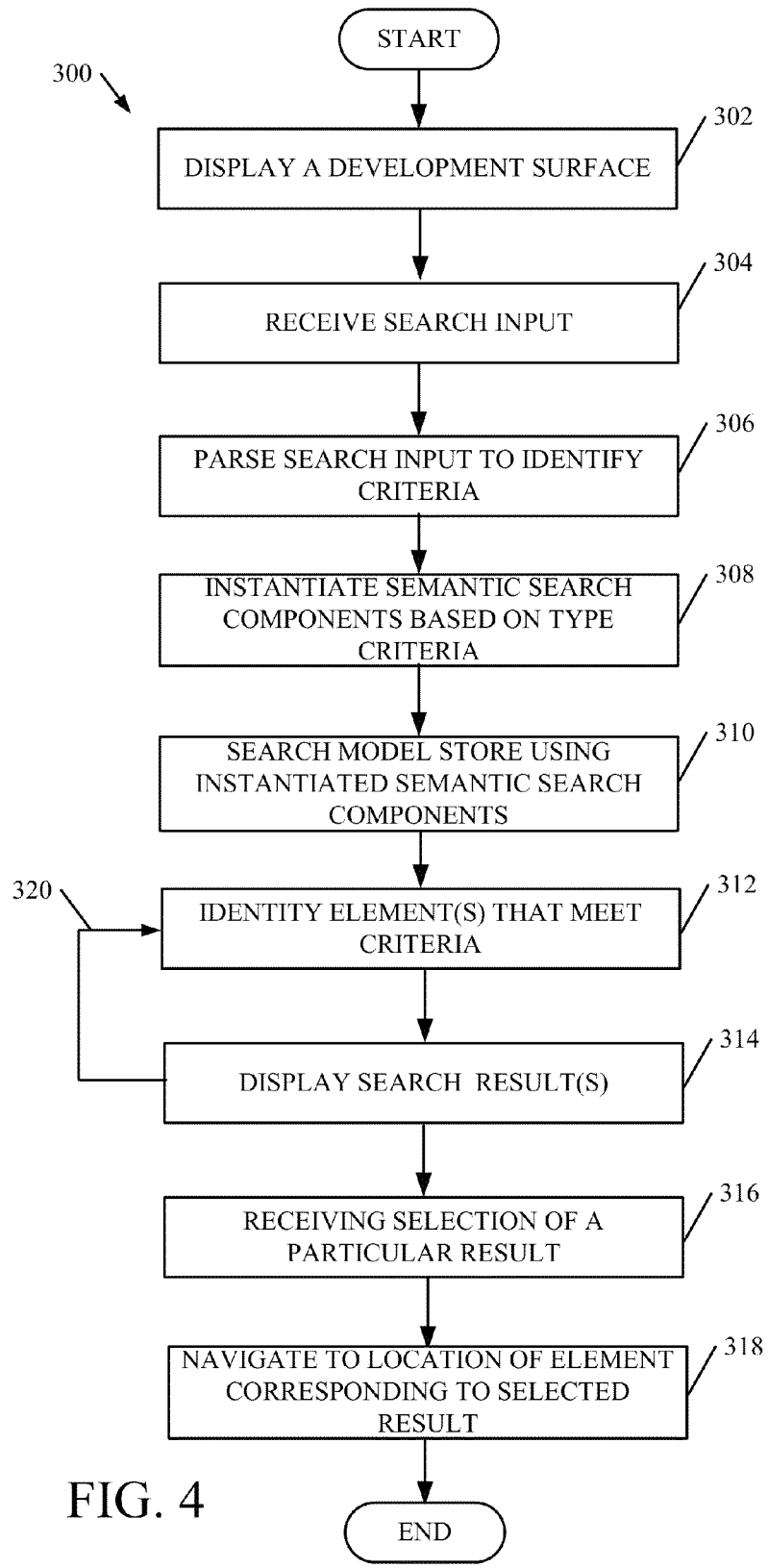
FIG. 4 is a flow diagram illustrating one example of a method for a performing a search using semantic search components.

FIG. 4 is a flow diagram illustrating one example of a method 300 for performing a search using semantic search components. For sake of illustration, but not by limitation, method 300 will be described in the context of architecture 100 performing a search using type-based search components.

At step 302, a development surface is displayed, for example using user interface display 116. At step 304, a search input is received, and at step 306, the search input is parsed to identify search criteria. Examples of search criteria include, but are not limited to, type-based constraints, method names, and property values. Search module 120 then searches model store 108 for elements that meet the search criteria.

At step 308, one or more type-based search components are identified and instantiated to search the model store 108. For example, as discussed above with respect to FIG. 3, a type-based search constraint can be explicitly defined in the search input. In another example, a type-based search constraint can be inferred from the tokens provide in the search input. For instance, for a property value provided in the search input, step 308 can determine which element types have the corresponding property.

Then, the one or more type-based search components are instantiated by search module 120 to search the elements in model store 108 based on the search query. In one example, a separate instantiation of a search component is created for each element of the corresponding element type.

The instantiated search component(s) are used to search the elements in model store 108 at step 310, and, at step 312, identify elements that meet the criteria identified from step 306. As discussed above, in one example, the search components can search serialized representations (e.g., XML files) of the elements, rather than directly searching the elements developed by developer 106.

By way of example, but not by limitation, while searching a serialized representation of an element in model store 108, a search component identifies a portion of the element that meet the search criteria by finding references (e.g., line and column number positions) to the corresponding elements in the serialized representations. The search component can distinguish the code from the metadata and, for a match identified in the serialized representation, computes the position in the code as if it searched the integrated code view that is presented to the developer. Thus, from the perspective of developer 106, the search module 120 searches and returns results within the code editor and/or metadata editor views, rather than the serialized representation.

In one example, the search component reads the element, converts it to an object-oriented expression, and applies its property getters to identify and match a property against a property-based search criteria from the search query. The search component converts the matched property into a corresponding path that uniquely identifies the property inside the object. For example, the path comprises a uniform resource identifier (URI), which can be a metadata path as discussed above.

At step 314, the results are returned as a set of links that indicate element matches to the search criteria. For example, the search component identifies an element match by returning the corresponding URI to an aggregator component of search module 120. The aggregator URI's are provided to user interface module 112 for presentation to developer 106.

At step 316, a selection by developer 106 of a particular URI is received, for example through user interaction such as a mouse click or other user input. Navigation module 122 decodes the selected URI to identify the corresponding element location. In one example, the URI comprises a reference to a distinct property (e.g., "source=crosscompany"), where selection of the URI opens a metadata editor at the location identify by the URI. In another example, the URI comprises a reference to a method body that includes a value, where selection of the URI opens a code editor.

In one example, the search results are obtained and displayed asynchronously. This is represented in FIG. 4 by arrow 320. That is, as the instantiated semantic search components identify an element that meets the search criteria at step 312, a URI for the identified element is displayed to the developer while the search continues in the background.

Figure 5:
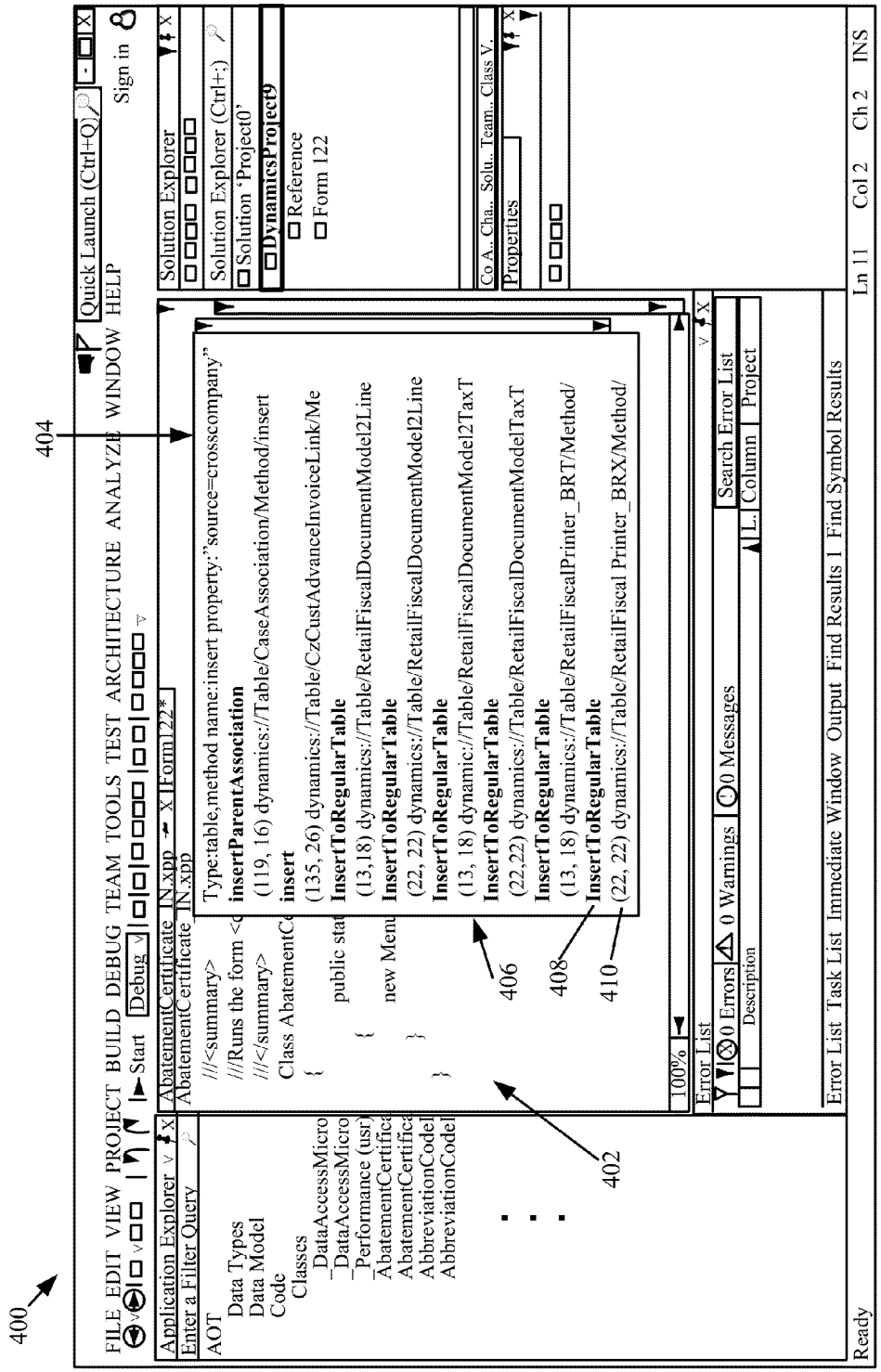
FIG. 5 illustrates one example of a user interface display.

FIG. 5 illustrates one example of a user interface display 400 that provides a development surface through which developer 106 can develop application elements and perform a search using architecture 100. For sake of illustration, but not by limitation, user interface display 400 will be described in the context of architecture 100.

User interface display 400 includes a code editor view 402 that receives developer inputs to author application elements 107 and a semantic search interface 404 that receives a developer search query. By way of example, the following search query has been entered in element 404:

type:table,    method    name:insert    property: "source=crosscompany"

Using the example syntax described with respect to FIG. 3, the search query specifies a type filter of "table", a method name filter of "insert", and a property name filter of "crosscompany". Search module 120 instantiates the type-based search component corresponding to a table type. The search query can be executed asynchronously which populates a results window 406 with search results URIs as they are obtained. That is, the search can begin by displaying one or more search result URIs in window 406, and then add additional search result URIs to window 406 as they are obtained. In this manner, developer 106 can continue to interact with user interface display 400, for example by clicking a desired URI, to direct view 402 to the corresponding search result while the search continues to run in the background to return any additional results. In the illustrated example, each URI includes label information 408 and location information 410 that identifies an element and a location of the element.

In one example, the search capability of search module 120 is exposed as an application programming interface (API) along with an object model, that is independent of the search query syntax. Using the API, a search operation can be invoked as a service on a network that can be consumed remotely from any of a plurality of different devices (e.g., subject to access rights and security). The parameters for the search API are objects in the object model and not a query string to confirm to a syntax. Thus, the search query syntax is decoupled from the searcher.

By way of example, a class diagram for the object model can include a plurality of different classes, with each class defining one or more semantic search constraints and methods to be called for searching and examining corresponding elements. Examples of semantic search constraints defined by the object model classes include, but are not limited to, type constraints, property constraints, code constraints, and name constraints.

Figure 6:
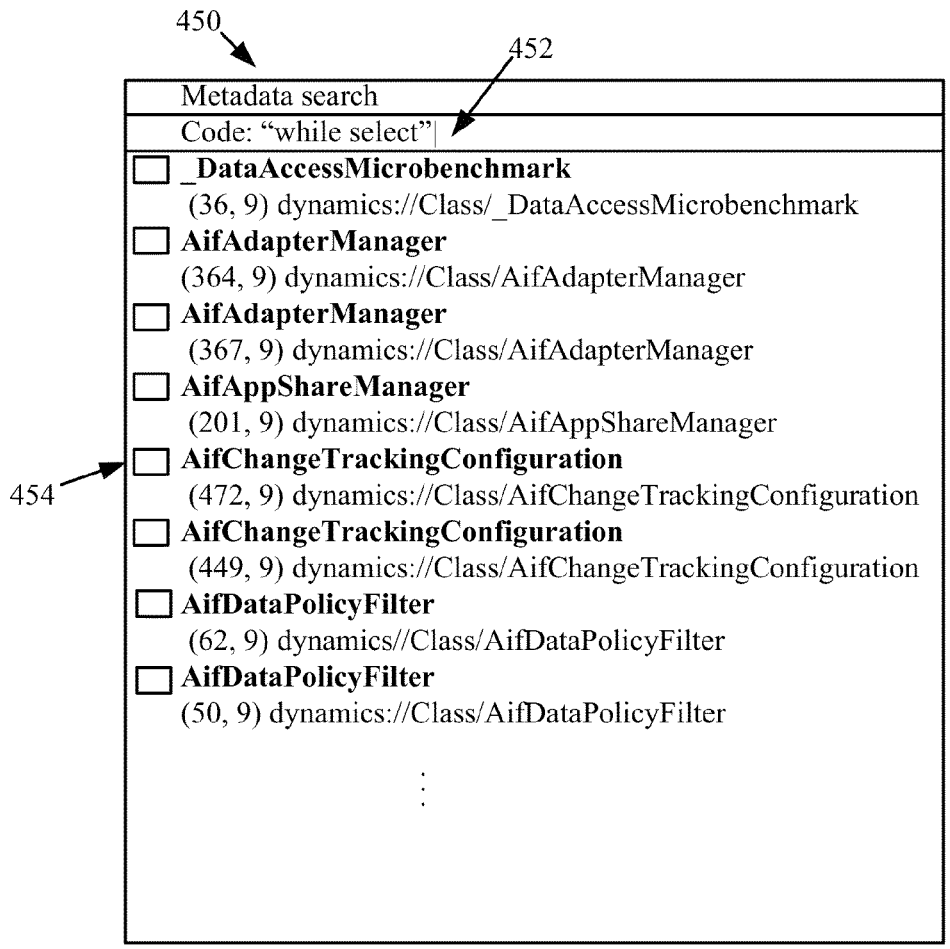
FIG. 6 illustrates one example of a user interface display.

FIG. 6 illustrates an example user interface 450 that renders search results using the search API. User interface 450 includes a query input field 452 that receives a search query defining the search parameters and a query results field 454 that displays the corresponding query results returned from the search module. In the illustrated example, the search parameters include a code constraint class and identify a string (i.e., "while select") for the code constraint. The code constraint class includes methods for matching the string, prioritizing the search, etc. The search module instantiates an object of the code constraint class and executes the search against the model store.

In one example, a different syntax can be provided depending on the device from which the search is initiated. For instance, from a developer desktop computer with a larger form factor screen, the developer can be allowed to enter a query string in a formal syntax. On the other hand, from a mobile device with a smaller form factor, entry in the formal syntax may be more difficult for the developer. The search architecture can be configured to facilitate query entry in a simpler form. For example, when using a mobile device or the like, the developer can be presented with controls having predefined search functions, such as a button assigned to a specific set of search constraints (e.g., a specific type-based search).

The present discussion has mentioned processors and servers. In one example, the processors and servers include computer processors with associated memory and timing circuitry, not separately shown. They are functional parts of the systems or devices to which they belong and are activated by, and facilitate the functionality of the other modules, components and/or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
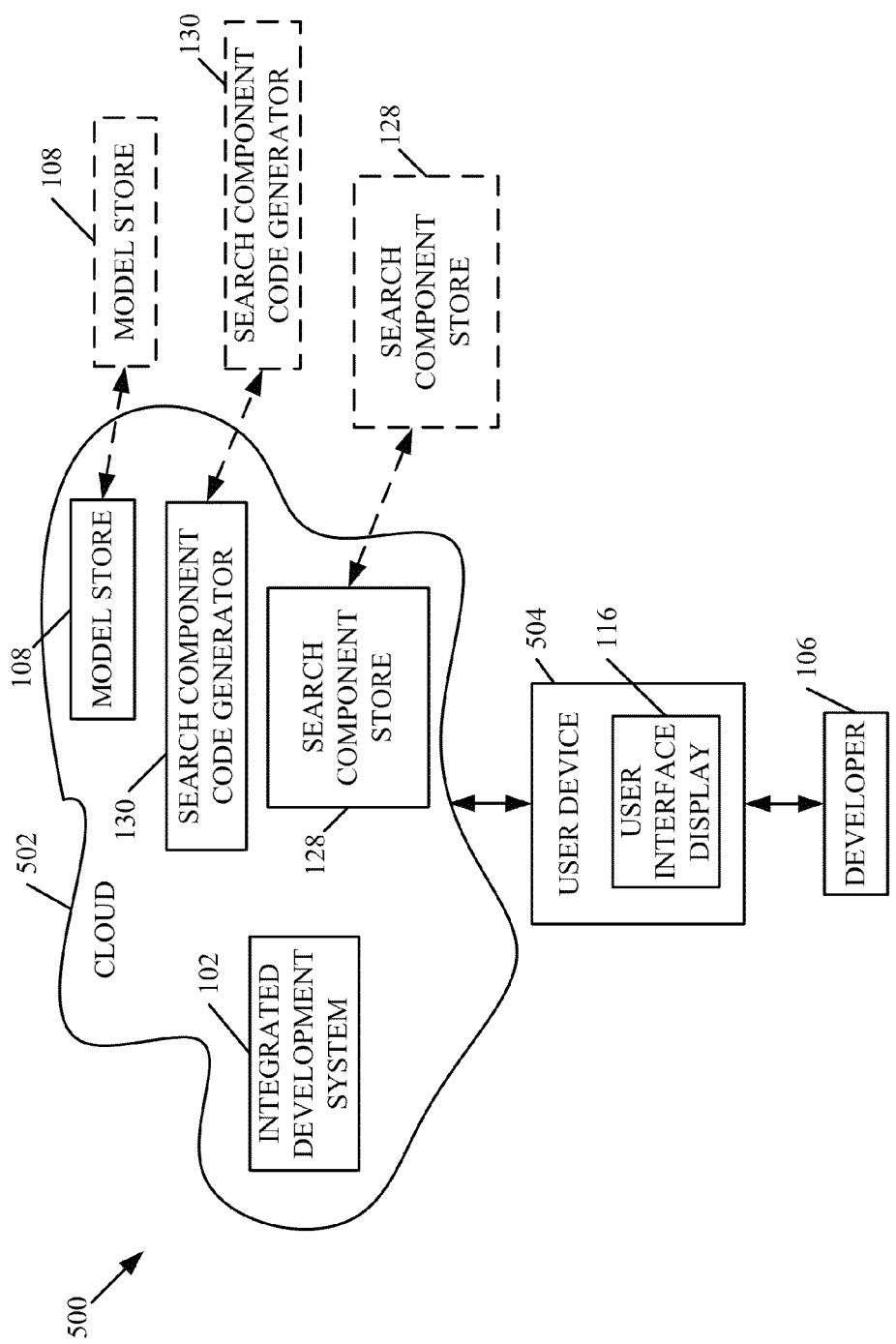
FIG. 7 is a block diagram showing one example of the architecture illustrated in FIG. 1, deployed in a cloud computing architecture.

FIG. 7 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software, modules, or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the modules, components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 7, some items are similar to those shown in FIG. 1 and they are similarly numbered. FIG. 7 specifically shows that interactive development system 102, model store 108, search component store 128, and search component code generator 130 can be located in cloud 502 (which can be public, private, or a combination where portions are public while others are private). Therefore, developer 106 uses a user device 504 to access those systems through cloud 502.

FIG. 7 also depicts another example of a cloud architecture. FIG. 7 shows that it is also contemplated that some elements of architecture 100 can be disposed in cloud 502 while others are not. By way of example, model store 108 can be disposed outside of cloud 502, and accessed through cloud 502. In another example, search component store 128 can also be outside of cloud 502. In another example, search component code generator 130 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
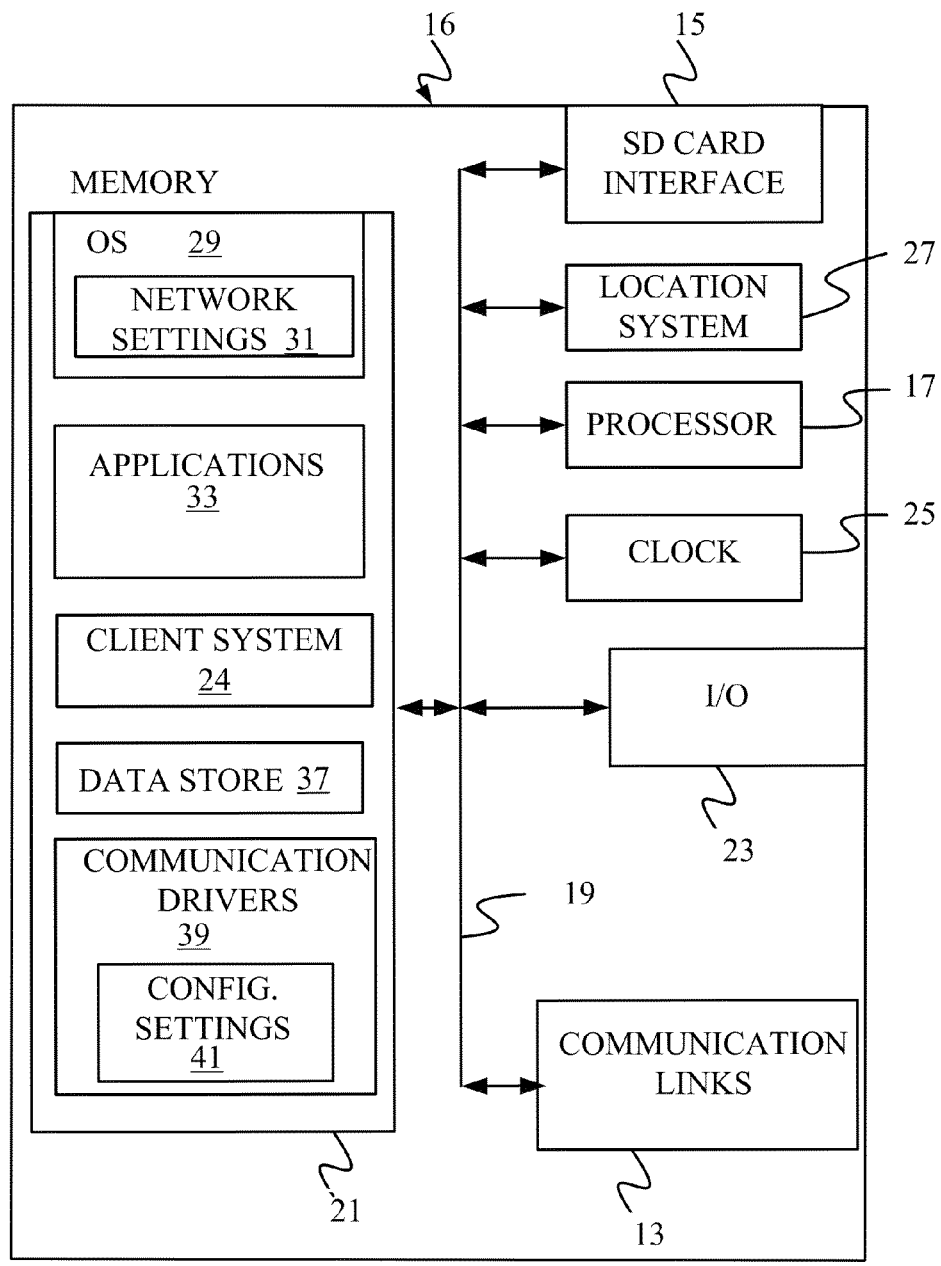
FIGS. 8-12 show various examples of mobile devices that can be used with the architecture shown in FIG. 1.

FIG. 8 is a simplified block diagram of one example of a handheld or mobile computing device that can be used as a user's or client's hand held device 16, in which the present system (or parts of it) can be deployed. FIGS. 9-12 are examples of handheld or mobile devices.

FIG. 8 provides a general block diagram of the components of a client device 16 that can run modules or components of architecture 100 or that interacts with architecture 100, or both. In the device 16, a communications link 13 is provided that allows the handheld device to communicate with other computing devices and in some examples provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 110 from FIG. 1) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 comprises a real time clock component that outputs a time and date. It can also provide timing functions for processor 17.

Location system 27 includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. It can also store a client system 24 which can be part or all of architecture 100. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other modules or components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 9:
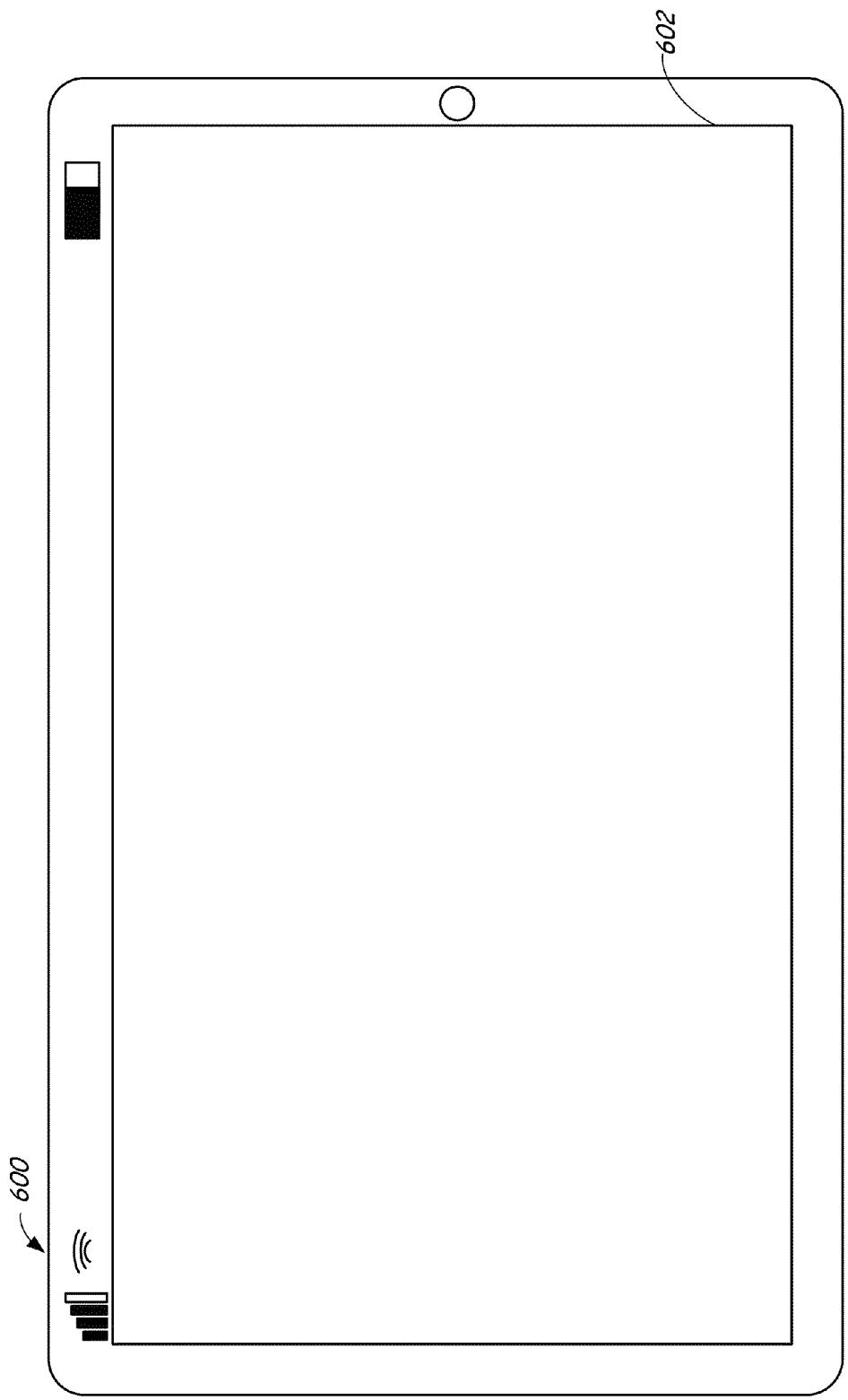

FIG. 9 shows one example in which device 16 is a tablet computer 600. In FIG. 9, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also receive voice inputs as well.

Figure 10:
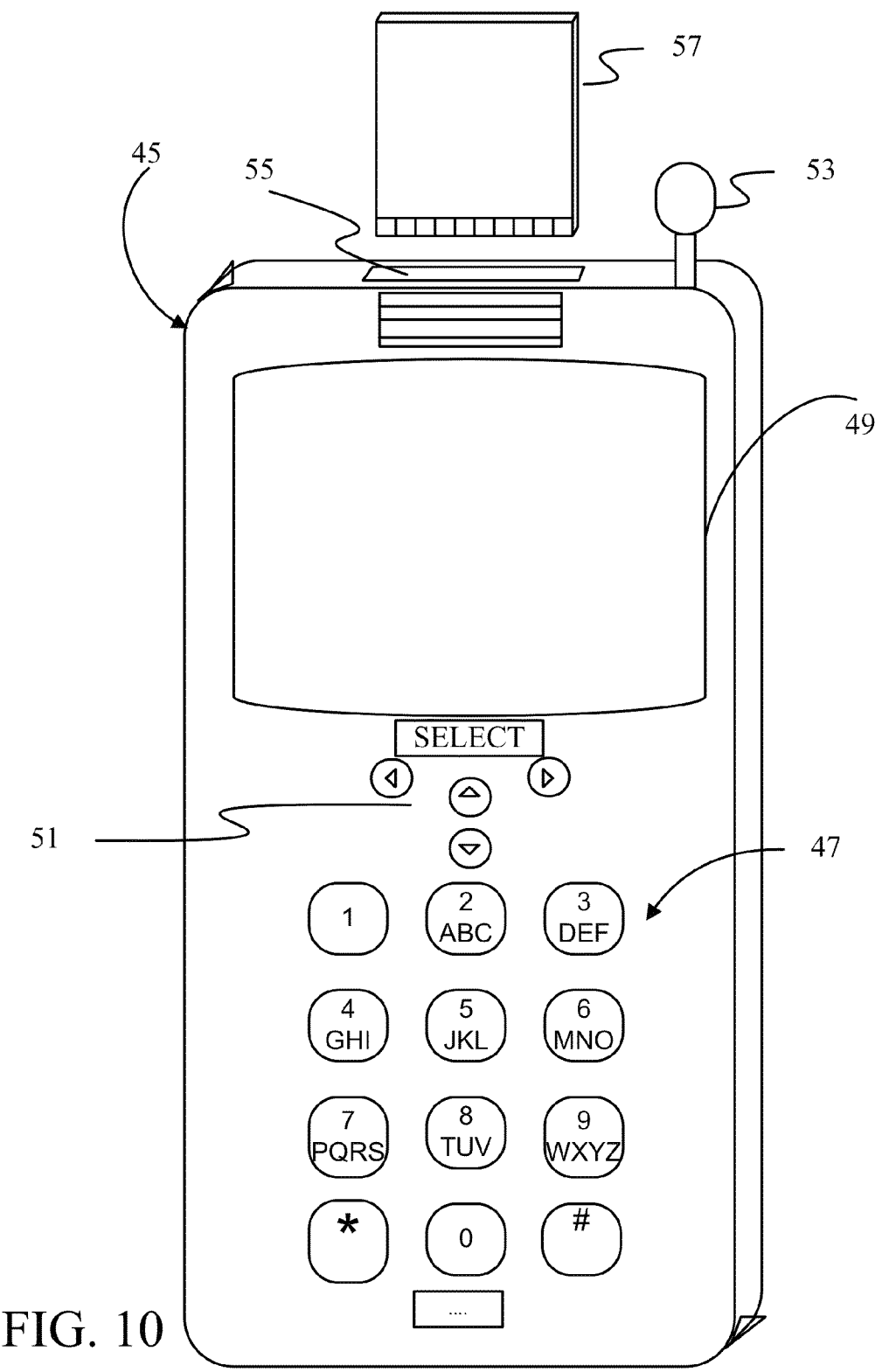
Figure 11:
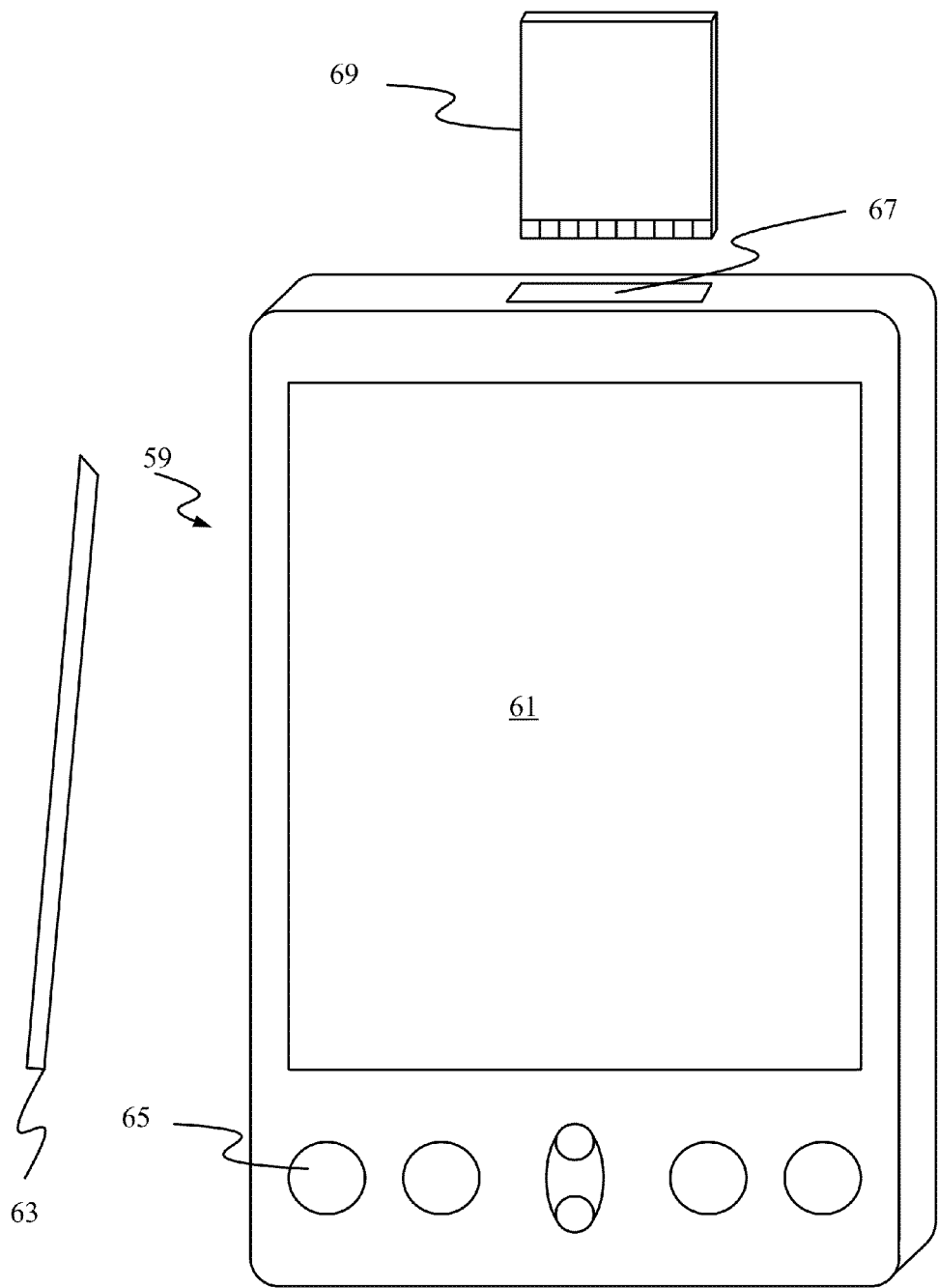

FIGS. 10 and 11 provide additional examples of devices 16 that can be used, although others can be used as well. In FIG. 10, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some examples, phone 45 also includes a Secure Digital (SD) card slot 55 that accepts a SD card 57.

The mobile device of FIG. 11 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one example, mobile device 59 also includes a SD card slot 67 that accepts a SD card 69.

Figure 12:
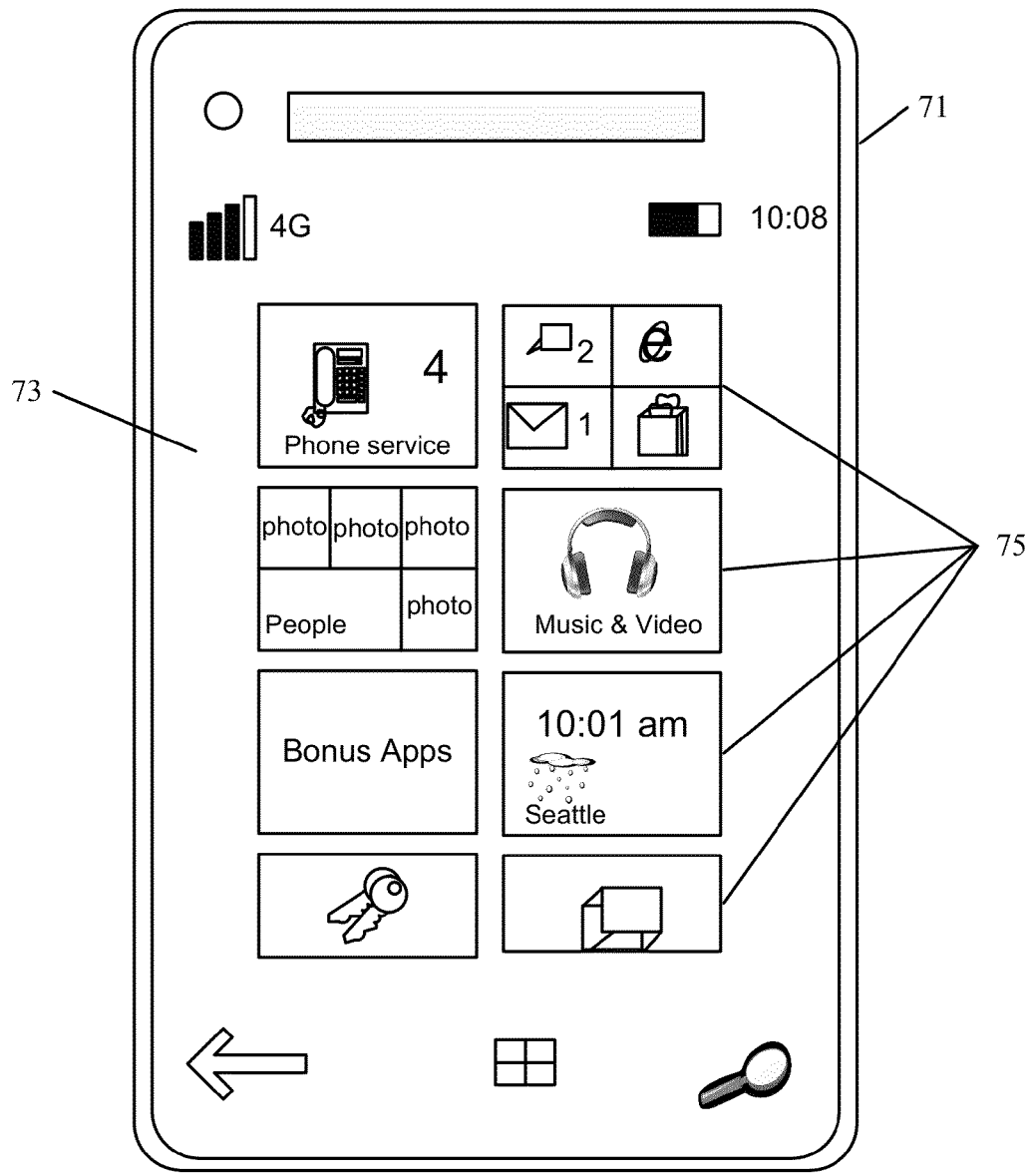

FIG. 12 is similar to FIG. 10 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
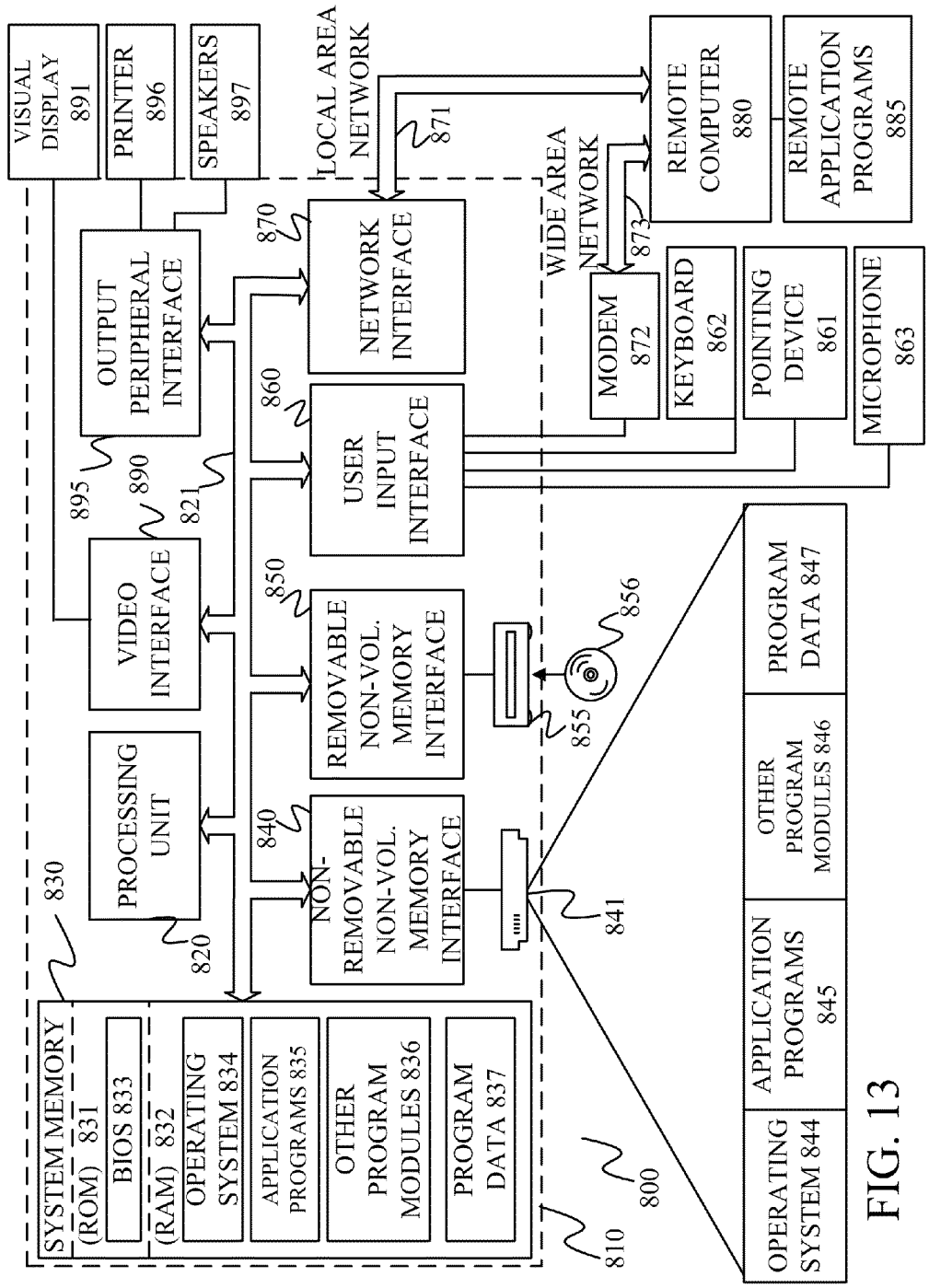
FIG. 13 is a block diagram of one example computing environment.

FIG. 13 is one example of a computing environment in which architecture 100, or parts of it, (for example) can be deployed. With reference to FIG. 13, an exemplary system for implementing some examples includes a general-purpose computing device in the form of a computer 810. Components of computer 810 may include, but are not limited to, a processing unit 820 (which can comprise processor 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 773, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a development system comprising a development module configured to receive user development inputs to develop elements of a computer system. The elements comprise types modeled in the computer system. The development system comprises a user interface module configured to generate a user interface display with user input mechanisms that receive a user search query for searching the elements of the computer system. The development system comprises a search module configured to identify a type-based search parameter for the user search query and to obtain a set of search results by performing an element search based on the user search query and the type-based search parameter.

Example 2 is the development system of any or all previous examples, wherein the development module is part of an interactive development environment (IDE).

Example 3 is the development system of any or all previous examples, wherein the user is a developer, and the elements of the computer system comprise application elements that are customized by the developer.

Example 4 is the development system of any or all previous examples, wherein the type-based search parameter identifies a particular element type selected from the types modeled in the computer system, and the search is constrained to elements having the particular element type.

Example 5 is the development system of any or all previous examples, wherein the user search query includes a character string and the particular element type.

Example 6 is the development system of any or all previous examples, wherein the set of search results comprise elements of the particular element type that have property values that match the character string.

Example 7 is the development system of any or all previous examples, wherein the elements of the computer system comprise a plurality of different types, each type having a set of properties and methods that define run-time behavior for elements of that element type. The system further comprises a search component store that stores a plurality of search components, each search component corresponding to a given one of the different types and being configured to facilitate a search of the set of properties and methods for elements of the given type.

Example 8 is the development system of any or all previous examples, wherein the search module is configured to identify a search component from the search component store that corresponds to the particular element type, identify each of a plurality of elements of the computer system that has the particular element type, and to search the identified elements based on the user search query using the identified search component.

Example 9 is the development system of any or all previous examples, wherein the identified search component is instantiated for each of the plurality of identified elements having the particular element type, and the search module is configured to obtain the set of search results by aggregating search results from the plurality of instantiated search components, and to display the aggregated search results in the user interface display.

Example 10 is the development system of any or all previous examples, wherein the set of search results are obtained and displayed asynchronously.

Example 11 is the development system of any or all previous examples, and further comprising a model store that stores, for each of the elements, a serialized representation of the element comprising code and metadata of the element. The search module is configured to perform the element search by accessing the serialized representations in the model store.

Example 12 is the development system of any or all previous examples, wherein the search module is configured to identify a particular serialized representation in the model store, corresponding to a given one of the elements, based on the type-based search parameter, and to search the particular serialized representation based on the user search query.

Example 13 is the development system of any or all previous examples, wherein the search module is configured to identify a portion of the given element, from the particular serialized representation, that matches the user search query, and to identify path information that uniquely identifies the portion of the given element.

Example 14 is the development system of any or all previous examples, wherein the path information comprises a uniform resource identifier (URI), the user interface module being configured to generate a user selectable representation of the URI, that is selectable to present the portion of the given element in an editor user interface.

Example 15 is a development system comprising a data store that models a plurality of different element types, a development module configured to receive developer inputs and to develop application elements of the different element types based on the developer inputs, and a search component generator configured to generate a different search component for each of the element types modeled in the data store. The development system also comprises a search component store configured to store the search components generated by the search component generator for the plurality of element types. Each search component is configured to search the developed application elements of a given one of the element types.

Example 16 is the development system of any or all previous examples, wherein the search component generator is configured to generate each search component by analyzing a structure of a given one of the element types and generating corresponding search functions based on the structure of the given element type.

Example 17 is the development system of any or all previous examples, wherein the structure of the given element type is defined by a set of properties and methods that define runtime behavior of elements having the given element type.

Example 18 is the development system of any or all previous examples, and further comprising a search module configured to receive a search query having at least one search term, identify a type-based search parameter for the search query, and identify one of the search components from the search component store based on the type-based search parameter. The identified search component is instantiated to search one or more of the application elements based on the search term.

Example 19 is a computer-implemented method of developing a computer system. The method comprises receiving development user inputs for developing elements of the computer system, the computer system comprising a plurality of different element types, each element type being defined by a property structure for elements of the element type. The method comprises generating a search interface display that receives a user search query to search the elements of the computer system, obtaining search results by performing a search of the elements of the computer system based on the user search query and a semantic search constraint that is based on the property structures of the elements of a computer system, and generating a results display that displays the search results.

Example 20 is the computer-implemented method of any or all previous examples, and further comprising accessing a data store that models a plurality of different element types, and for each different element type, generating a corresponding type-based search component based on a property structure of the element type. The method comprises using at least one of the generated type-based search components, that is selected based on the semantic search constraint, to search the data store based on the user search query.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A development system comprising:
a processor;
memory coupled to the processor and storing instructions which, when executed by the processor, configure the development system to:
receive an indication of a user development input to develop a computer system, the computer system comprising elements of a plurality of different element types modeled in the computer system;
generate a representation of a user interface display with a search user input mechanism;
receive an indication of a user search query from the search user input mechanism, the user search query identifying a search criterion for searching the elements of the computer system; and
identify a type-based search parameter that is based on the user search query and identifies a particular one of the different element types modeled in the computer system; and
obtain a search result by performing an element search based on the search criterion and the type-based search parameter.

2. The development system of claim 1, comprising an interactive development environment (IDE) configured to develop an element of the computer system based on the indication of the user development input by defining at least one of code or metadata for the element.

3. The development system of claim 1, wherein the instructions configure the development system to:
generate a search component by parsing a structure of the particular element type and generating search code configured to search the structure of the particular element type; and
instantiate the search component to perform the element search by executing the search code.

4. The development system of claim 1, wherein the element search is constrained using the particular element type as filter criterion to return an element having the particular element type.

5. The development system of claim 4, wherein the user search query identifies a character string and the particular element type.

6. The development system of claim 5, wherein the returned element comprises an element of the particular element type that has a property value that matches the character string.

7. The development system of claim 1, wherein each element type comprises a set properties and methods that define run time behavior for elements of that element type, and wherein the instructions configure the development system to:
generate a plurality of search components, each search component corresponding to a given one of he different types and being configured to search the set of properties and methods for elements of the given type.

8. The development system of claim 7, wherein the instructions configure the development system to obtain the search result by selecting a search component from the plurality of search components that corresponds to the particular element type, identifying an element of the computer system that have the particular element type, and searching the identified element based on the user search query using the selected search component.

9. The development system of claim 8, wherein the selected search component is instantiated for each of a plurality of identified elements having the particular element type and obtains a set of search results by aggregating search results from the plurality of instantiated search components, and wherein the instructions configure the development system to:
instruct a display device to display the aggregated search results in the user interface display.

10. The development system of claim 9, wherein instructions configure the development system to:
in parallel,
instruct the display device to display aggregated search results in the user interface display; and
obtain additional search results from the element search.

11. The development system of claim 1, and further comprising:
a model store that stores a serialized representation of each of the elements, the serialized representation comprising code and metadata of the element; and
wherein the element search is performed by accessing the serialized representations in the model store.

12. The development system of claim 11, wherein the instructions configure the development system to:
identify a particular one of serialized representations in the model store based on the type-based search parameter; and
search the particular serialized representation based on the user search query.

13. The development system of claim 12, wherein the instructions configure the development system to:
analyze the particular serialized representation to identify a portion of a given element that matches the user search query; and
obtain path information that uniquely identifies the portion of the given element.

14. The development system of claim 13, wherein the path information comprises a uniform resource identifier (URI), and wherein the instructions configure the development system to:
generate a user selectable representation of the URI, that is selectable to generate an editor user interface that displays the portion of the given element.

15. A development system comprising:
a processor;
memory coupled to the processor and storing instructions which, when executed by the processor, configure the development system to:
receive a developer input in a development environment to develop an application, the application comprising application elements of different element types;
generate a plurality of different search components for the different element types, wherein each search component corresponds to one of the different element types and is configured to search an application element of the corresponding element type; and
store the search components.

16. The development system of claim 15, wherein the instructions configure the development system to:
generate each search component by analyzing a structure of the corresponding element type and generating search code that is specific to the corresponding element type based on the structure of the corresponding element type.

17. The development system of claim 16, wherein the structure of the corresponding element type is defined by a set of properties and methods that define runtime behavior of elements having the corresponding element type.

18. The development system of claim 17, and wherein the instructions configure the development system to:
 receive an indication of a search query having at least one search term;
 identify a type-based search parameter for the search query; and
 select one of the search components based on the type-based search parameter, wherein the selected search component is instantiated to search the application elements based on the search term.

19. A computer-implemented method of developing a computer system, the method comprising:
 receiving development user inputs for developing elements of the computer system, the computer system comprising a plurality of different element types, each element type being defined by a property structure for elements of the element type;
 generating a search interface display that receives a user search query to search the elements of the computer system;
 obtaining search results by performing a search of the elements of the computer system based on the user search query and a semantic search constraint that is based on the property structures of the elements of a computer system; and
 generating a results display that displays the search results.

20. The computer-implemented method of claim 19, and further comprising:
 accessing a data store that models a plurality of different element types;
 for each different element type, generating a corresponding type-based search component based on a property structure of the element type;
 selecting one of the type-based search components based on the semantic search constraint; and
 using the selected type-based search components to search the data store based on the user search query.

* * * * *